United States Patent [19]

Yamamoto et al.

[11] Patent Number: 4,850,663
[45] Date of Patent: Jul. 25, 1989

[54] LIGHT SCANNING SYSTEM

[75] Inventors: Yoshiharu Yamamoto, Toyonaka; Yuichi Kimura, Higashiosaka, both of Japan

[73] Assignee: Matsushita Electric Industrial Co., Ltd., Osaka, Japan

[21] Appl. No.: 35,282

[22] Filed: Apr. 7, 1987

[30] Foreign Application Priority Data

Apr. 11, 1986 [JP] Japan .................. 61-84535

[51] Int. Cl.$^4$ .............. G02B 26/10; G02B 3/06
[52] U.S. Cl. ................. 350/6.8; 350/433; 350/434
[58] Field of Search .......... 350/6.5, 6.6, 6.7, 6.8, 350/6.9, 433, 434

[56] References Cited

U.S. PATENT DOCUMENTS

| 3,750,189 | 7/1973 | Fleischer | 350/6.8 |
| 4,123,135 | 10/1978 | Rabedeau | 350/6.8 |
| 4,674,825 | 6/1987 | Tateoka et al. | 350/6.8 |

FOREIGN PATENT DOCUMENTS

| 2250763 | 10/1972 | Fed. Rep. of Germany . |
| 2834085 | 8/1978 | Fed. Rep. of Germany . |
| 2917163 | 4/1979 | Fed. Rep. of Germany . |
| 2924673 | 6/1979 | Fed. Rep. of Germany . |
| 3207441A1 | 3/1982 | Fed. Rep. of Germany . |
| 3440157A1 | 11/1984 | Fed. Rep. of Germany . |
| 56-36623 | 4/1981 | Japan . |
| 57-144516 | 9/1982 | Japan . |
| 0034512 | 2/1984 | Japan | 350/6.8 |

OTHER PUBLICATIONS

Mirrors, Prisms and Lenses by James P. C. Southall, The Macmillan Company 1923, p. 178.

Primary Examiner—Bruce Y. Arnold
Assistant Examiner—Ronald M. Kachmarik
Attorney, Agent, or Firm—Wenderoth, Lind & Ponack

[57] ABSTRACT

A light scanning system uses a tilting angle error correcting system, applying a conjugate relation from geometrical optics. A light beam from a light source is converged to a linear image near a deflecting surface of a deflector by a first converging optical system. The deflected light beam from the deflecting surface is converged to a light spot on a scanning plane by a second converging optical system. The first converging optical system provides the light converging effect only in a plane perpendicular to the direction of scan and also has an overcorrected spherical aberration, so that the spherical aberration of the entire system can be favorably corrected, thereby making it possible to obtain a high converging performance for realizing high resolution.

18 Claims, 9 Drawing Sheets

LIGHT SCANNING SYSTEM

BACKGROUND OF THE INVENTION

1. Field of the Invention

This invention relates to a light scanning system for deflecting a light beam from a light source by means of a deflecting device, thereby scanning a scanning plane.

2. Description of the Prior Art

Conventionally, in a light scanning system using a deflecting device possessing a deflecting surface, such as rotating polygon mirror, various methods are known to prevent uneven pitches of scanning lines on the scanning plane even if the deflected and scanned light beam is changed within the plane perpendicular to the scanning plane due to tilting of the deflecting surface. For example, the light scanning systems disclosed in Japanese Laid-open Patent Application Nos. 56-36622, 57-144516, and U.S. Pat. Nos. 3,750,189, 4,123,135 are comprised of a light source for producing a light beam collimated to a proper beam diameter, a first converging optical system comprised of a single flat convex cylindrical lens for converging the light beam to a linear image, a deflecting device having a deflecting surface near the converging position of the linear image, and a second converging optical system comprised of a single spherical lens and a single toric lens for converging the deflected light beam to a spot image on the scanning plane. The deflecting surface and the scanning plane are in a conjugate relation from geometrical optics within a plane perpendicular to the direction of scan, and the tilt of the deflecting surface is optically corrected, whereby uneven pitches of the scanning lines are corrected.

However, in the conventional light scanning systems, the aperture ratio is small, being 1:60 in the plane parallel to the direction of scan and 1:100 in the plane perpendicular to the direction of scan, and the spot diameter on the scanning plane of the light beam is about 100 μm. Such corresponds to a resolution of only about 10 dots per 1 mm. To increase the aperture ratio while reducing the spot diameter, a sufficient aberration correction is needed. In the conventional light scanning system, the optical power in the plane perpendicular to the direction of scan of the second converging optical system must be strong in order to satisfy the conjugate relation from geometrical optics. Therefore, the spherical aberration in the plane perpendicular to the direction of scan is insufficiently corrected, and it is hard to increase the aperture ratio because the residual aberration is large, which is a great obstacle in enhancing the resolution.

SUMMARY OF THE INVENTION

It is hence a primary object of this invention to present a light scanning system exhibiting a high performance with respect to favorably correcting and reducing residual aberration, in particular, the spherical aberration in the plane perpendicular to the direction of scan.

In order to achieve this object, the light scanning system of this invention is arranged to converge a light beam from a light source to a linear image in the vicinity of a deflecting surface by means of a first converging optical system providing a light converging action only in the plane perpendicular to the direction of scan and being designed so as to generate an over-corrected spherical aberration. This over-corrected spherical aberration is canceled with an under-corrected spherical aberration in the plane perpendicular to the direction of scan of a second converging optical system. As a result, the residual aberration of the entire system is significantly decreased. It is hence possible to increase the aperture ratio, and to reduce the spot diameter on the scanning plane, so that a light scanning system suited to high printing quality can be realized.

DESCRIPTION OF THE PREFERRED EMBODIMENTS

Figure 1:
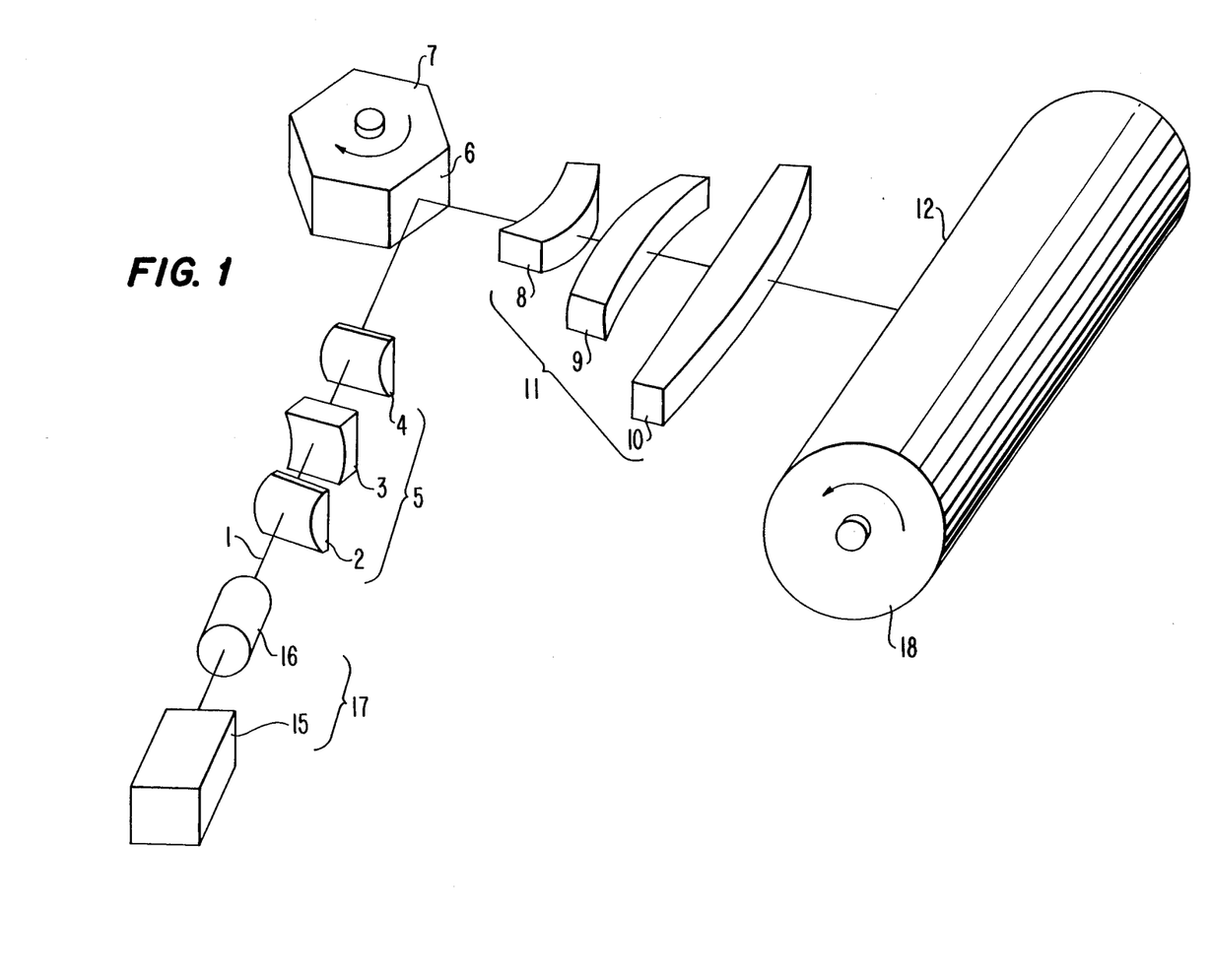
FIG. 1 is a perspective view showing a first embodiment of a light scanning system of this invention.

FIG. 1 is a perspective view showing a first embodiment of a light scanning system of this invention. A laser light source 17 is comprised of a laser oscillator 15 for generating a laser beam and a collimator lens 16 for forming a collimated light beam 1. This light beam 1 is linearly converted in the direction of scan in the vicinity of a deflecting surface 6, by means of a first converging optical system 5 comprised of, sequentially from the light source 17, a positive flat convex cylindrical lens 2, a negative flat concave cylindrical lens 3, and a positive flat convex cylindrical lens 4.

The deflecting surface 6 is one of the plural deflecting surfaces of a rotating polygon mirror 7. The mirror is rotated by a motor (not shown) to deflect the light beam.

The light beam deflected by this deflecting surface 6 forms a scanning spot on a scanning plane 12 defined on a rotating photosensitive drum 18, by means of a second converging optical system 11 comprised of two spherical lenses 8, 9 and a toric lens 10. It is preferable that these two spherical lenses 8, 9 and the toric lens 10 have external shapes large enough to accommodate the range of the light beam deflected by the rotating mirror 6 while allowing the size of the light scanning system to be reduced as shown in FIG. 1.

Figure 2A:
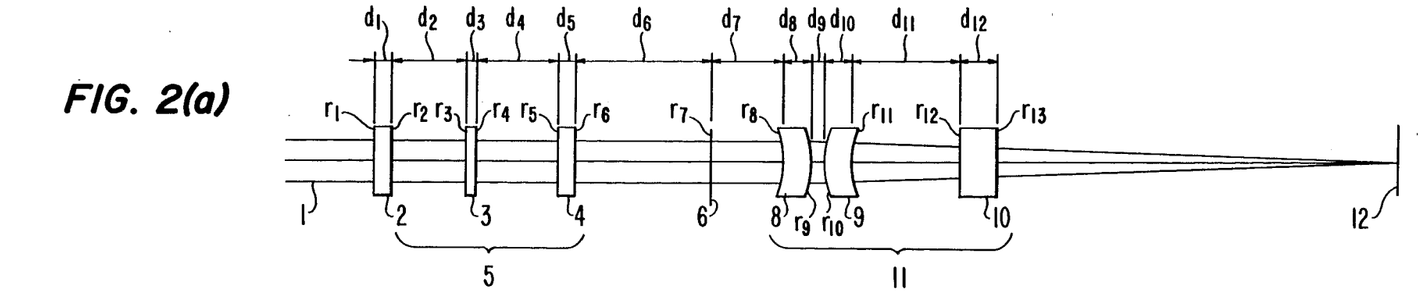
FIGS. 2(a), (b) are schematic diagrams showing an optical element arrangement in the plane parallel to the direction of scan and in the plane perpendicular to the direction of scan, respectively, of the first embodiment.
Figure 2B:
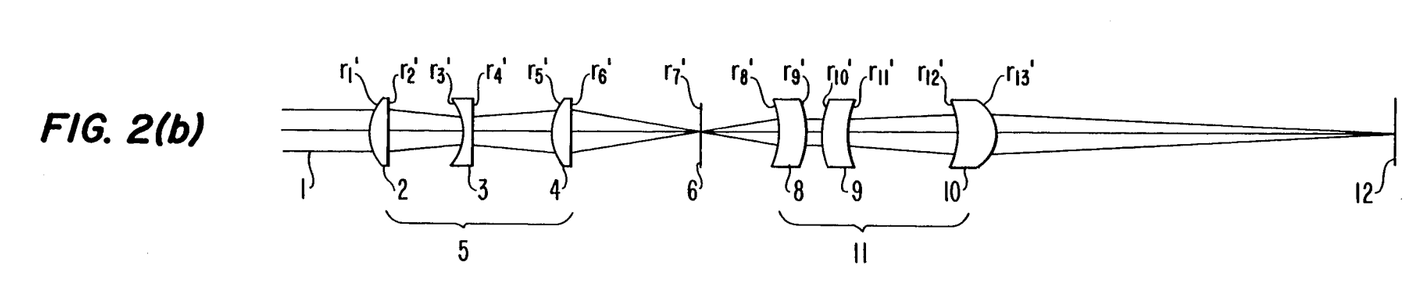

FIGS. 2(a), (b) show an arrangement of the optical elements in the plane parallel to the direction of scan and in the plane perpendicular to the direction of scan, respectively, of the first embodiment. As shown in FIG. 2(b), in the plane perpendicular to the direction of scan with respect to the second converging optical system 11, the deflecting surface 6 and the scanning surface 12 are in a conjugate relation from geometrical optics. Therefore, a correction in the tilt of the deflecting surface is facilitated. The second converging optical system facilitating such action has a greater optical power in the plane perpendicular to the direction of scan than in the deflecting direction, so that an under-corrected spherical aberration occurs in the plane perpendicular to the direction of scan.

In this embodiment, as mentioned above, the first converging optical system consisting of the cylindrical lens group generates an over-corrected spherical aberration in the plane perpendicular to the direction of scan, so as to cancel the under-corrected spherical aberration generated in the second converging optical system. As a result, the spherical aberration of the entire system is notably reduced, so that it is possible to increase the aperture ratio.

Figure 3A:
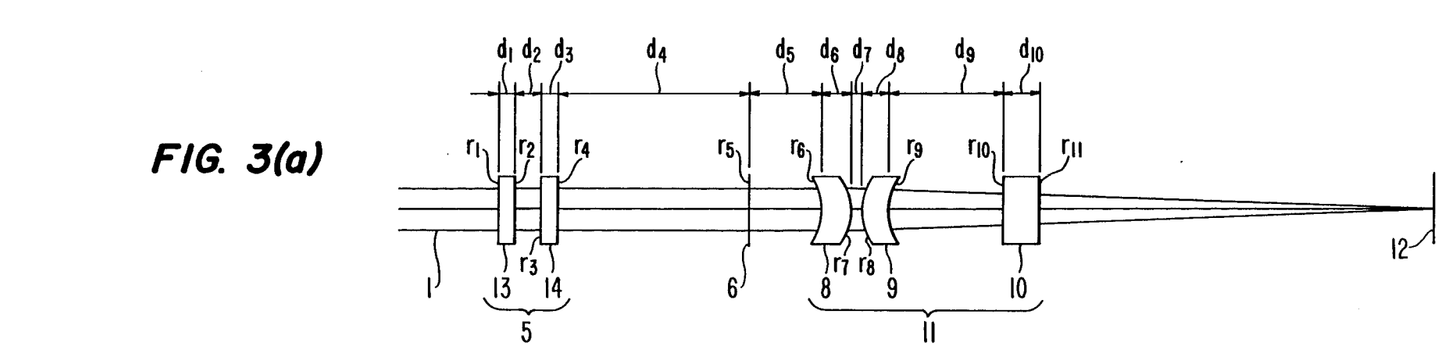
FIGS. 3(a), (b) are schematic diagrams showing an optical element arrangement in the plane parallel to the direction of scan and in the plane perpendicular to the direction of scan, respectively, of a second embodiment.
Figure 3B:
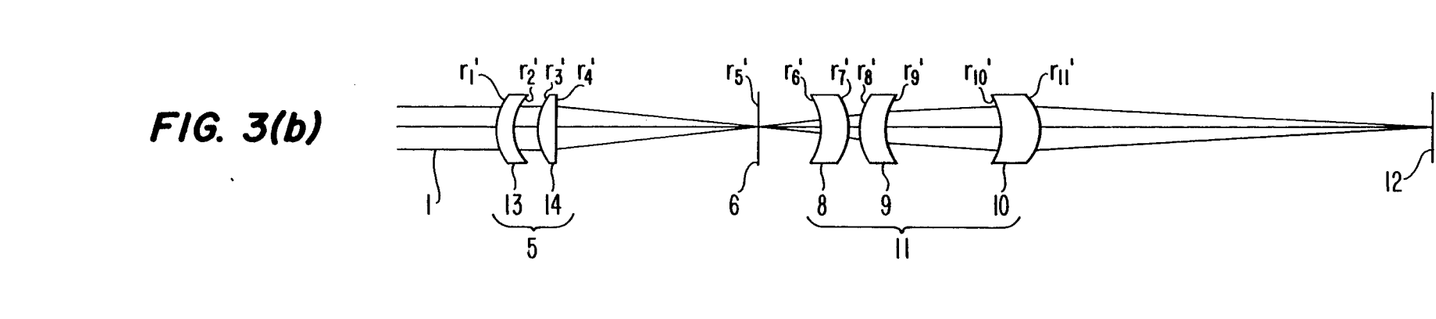
Figure 4A:
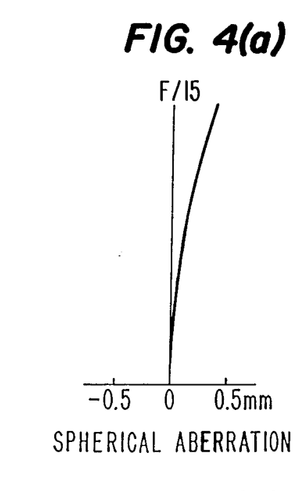
FIGS. 4 through 14 are graphs in which characteristic curves of first through eleventh examples of the present invention are plotted, in each of which (a) relates to the spherical aberration in the plane perpendicular to the direction of scan of the first converging optical system, (b) to the spherical aberration in the plane perpendicular to the direction of scan of the second converging optical system, (c) to the spherical aberration in the plane perpendicular to the direction of scan of the whole system, (d) to the astigmatism, and (e) to the linearity of scan.
Figure 4B:
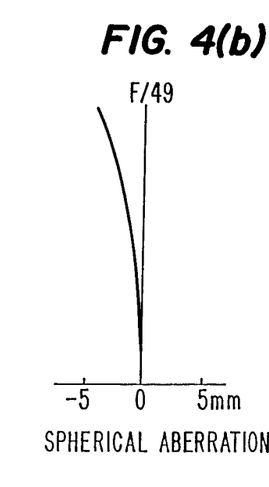
Figure 4C:
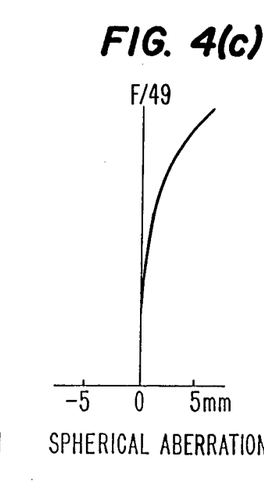
Figure 4D:
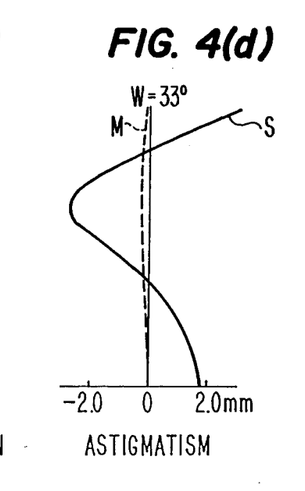
Figure 4E:
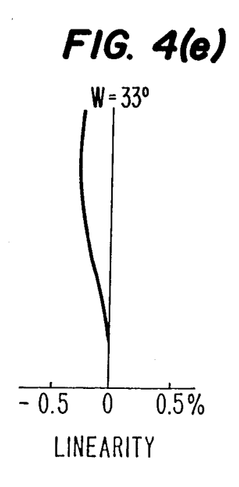
Figure 5A:
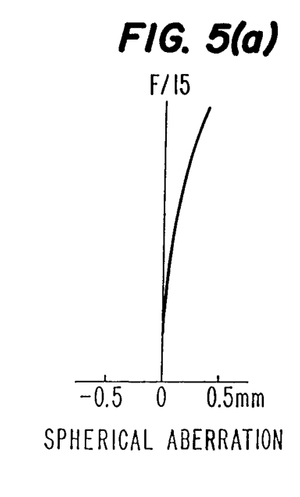
Figure 5B:
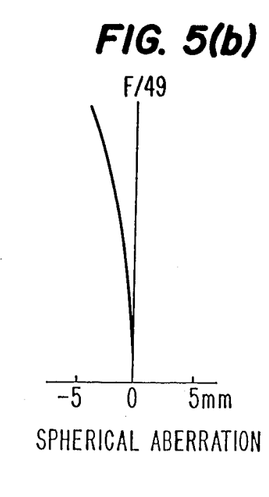
Figure 5C:
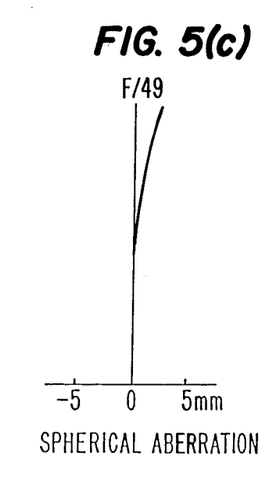
Figure 5D:
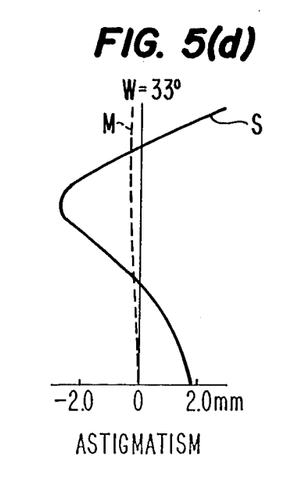
Figure 5E:
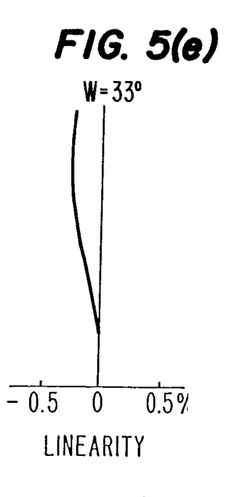
Figure 6A:
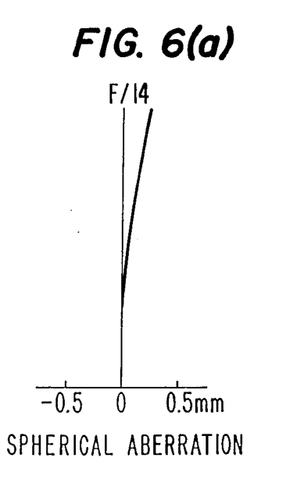
Figure 6B:
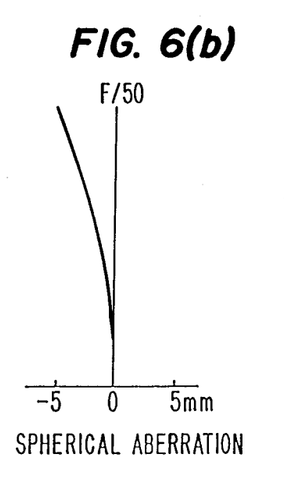
Figure 6C:
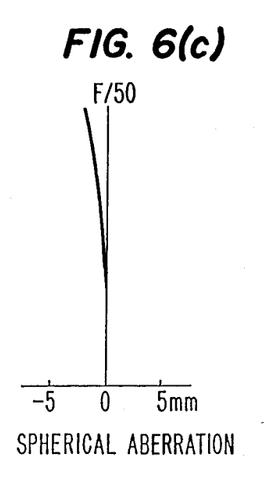
Figure 6D:
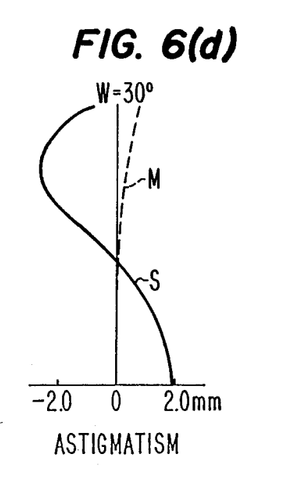
Figure 6E:
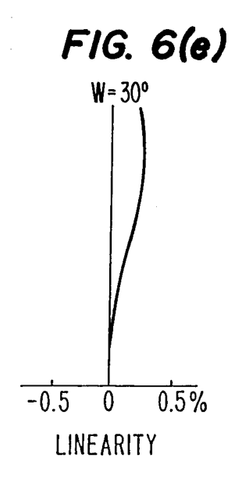
Figure 7A:
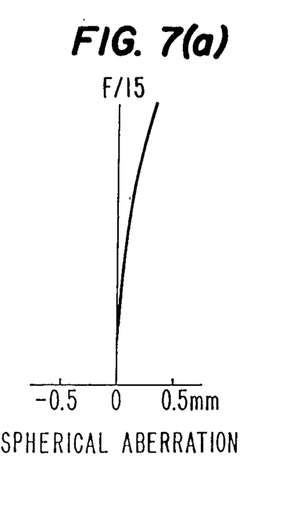
Figure 7B:
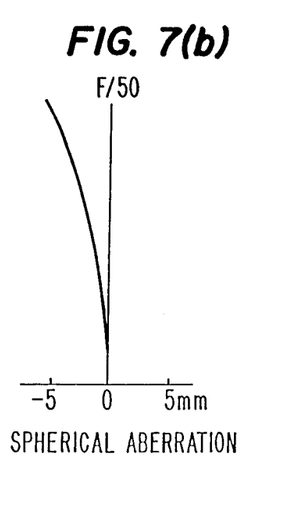
Figure 7C:
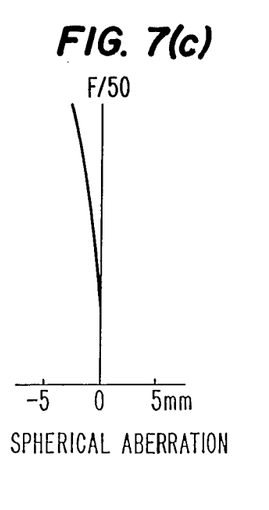
Figure 7D:
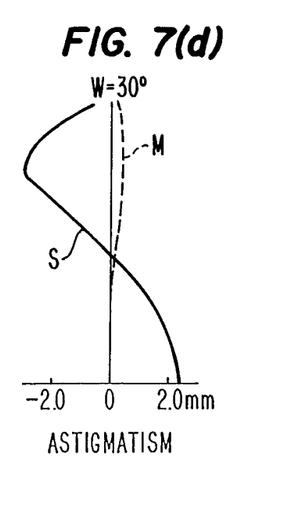
Figure 7E:
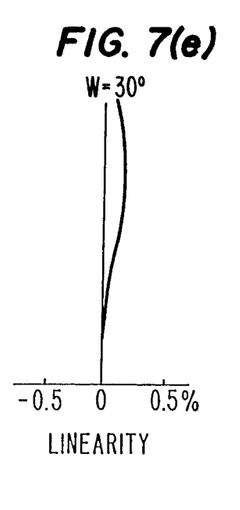
Figure 8A:
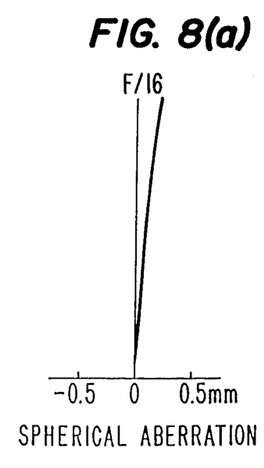
Figure 8B:
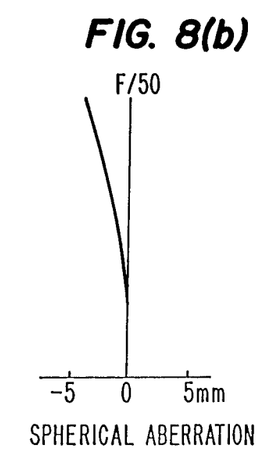
Figure 8C:
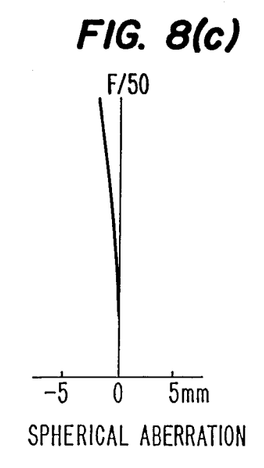
Figure 8D:
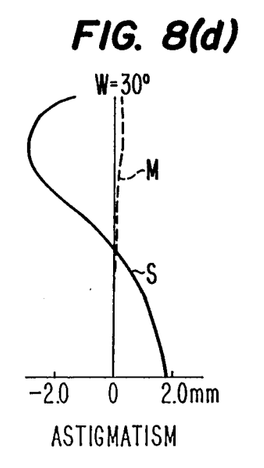
Figure 8E:
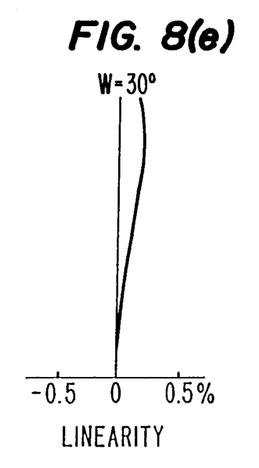
Figure 9A:
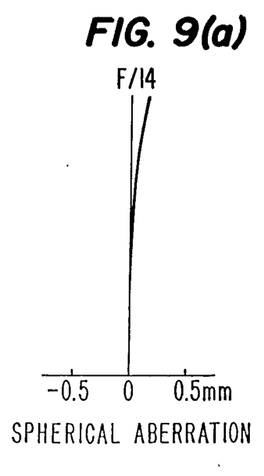
Figure 9B:
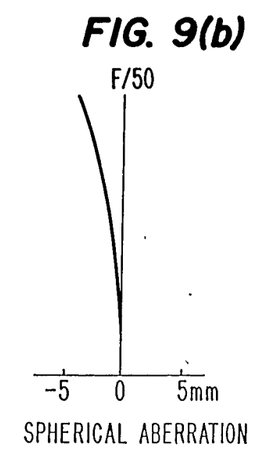
Figure 9C:
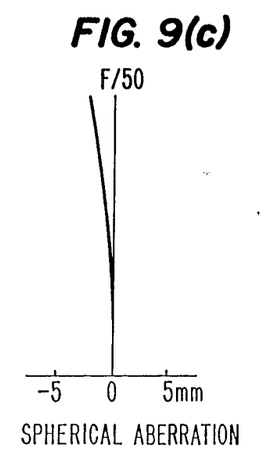
Figure 9D:
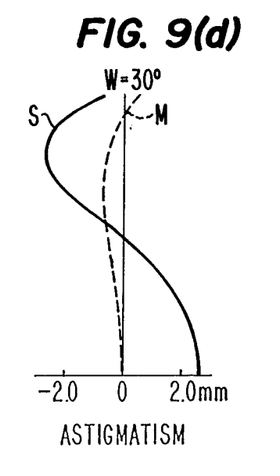
Figure 9E:
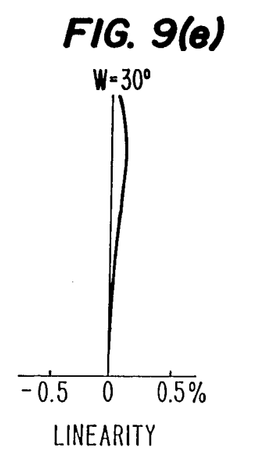
Figure 10A:
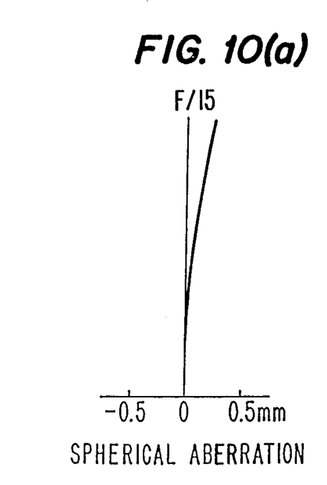
Figure 10B:
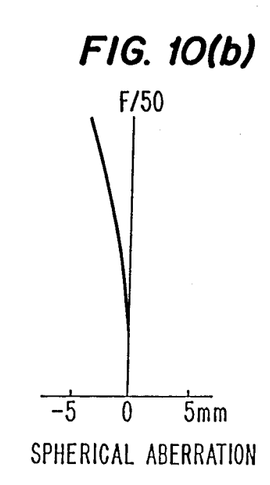
Figure 10C:
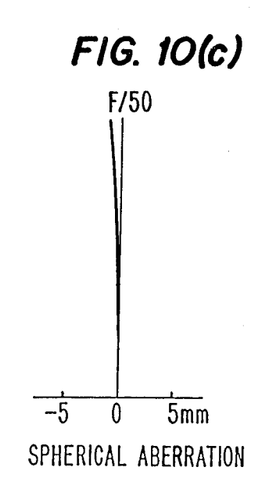
Figure 10D:
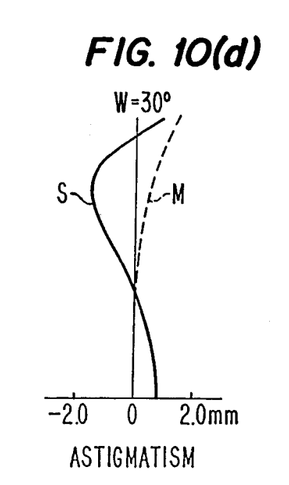
Figure 10E:
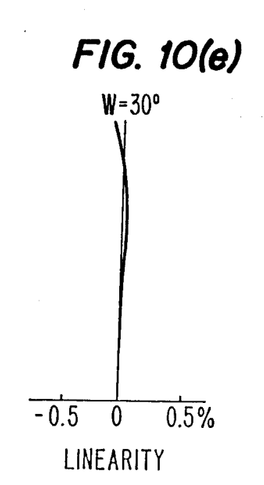
Figure 11A:
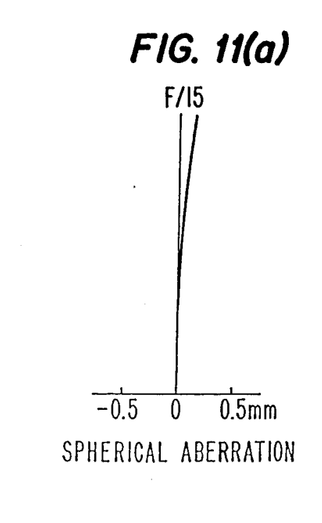
Figure 11B:
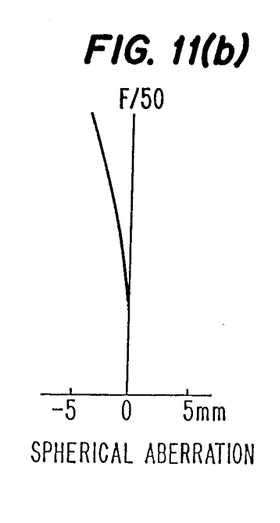
Figure 11C:
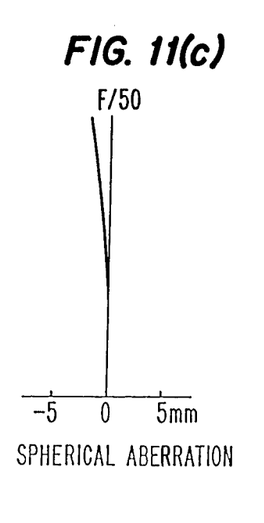
Figure 11D:
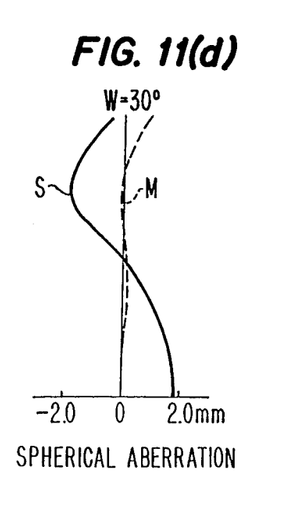
Figure 11E:
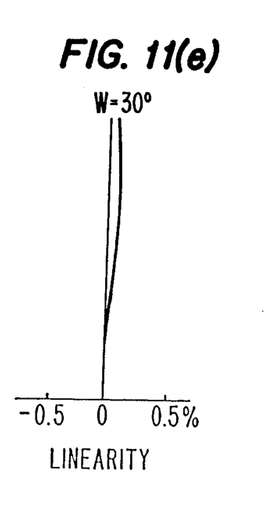
Figure 12A:
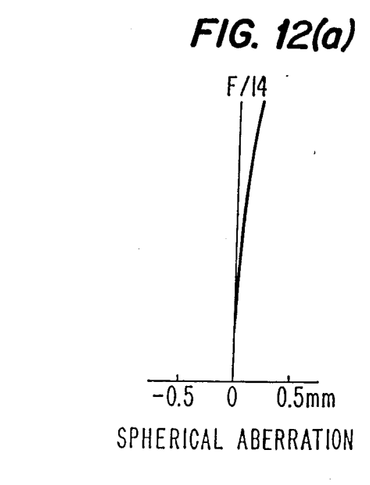
Figure 12B:
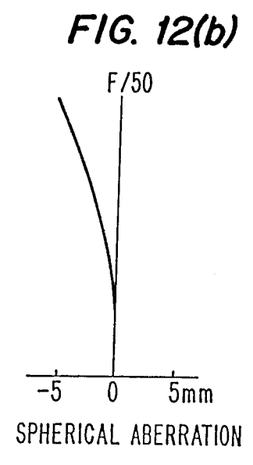
Figure 12C:
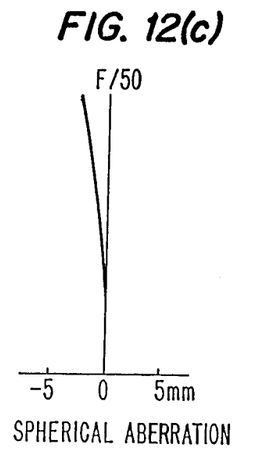
Figure 12D:
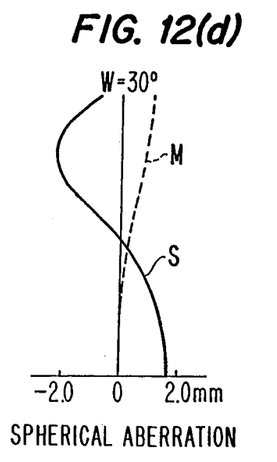
Figure 12E:
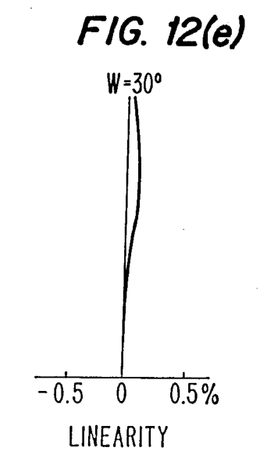
Figure 13A:
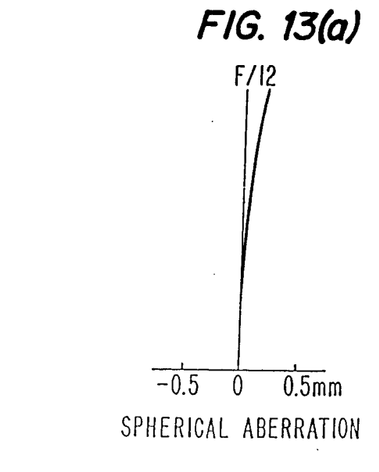
Figure 13B:
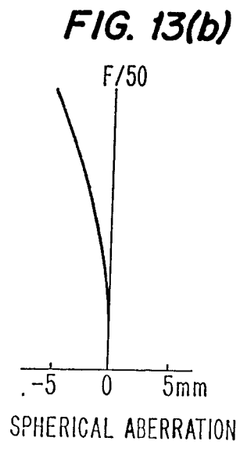
Figure 13C:
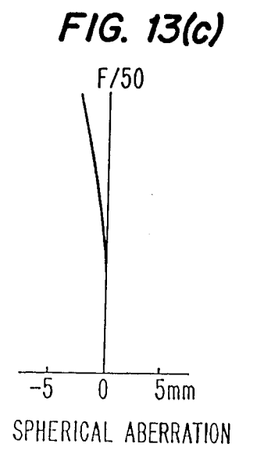
Figure 13D:
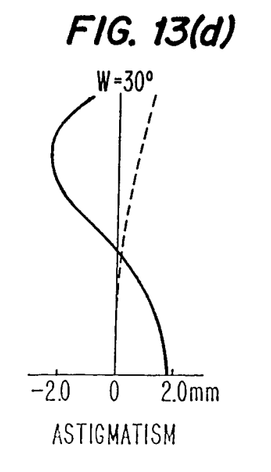
Figure 13E:
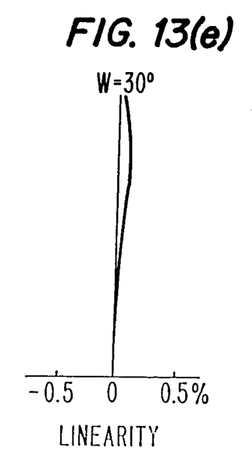
Figure 14A:
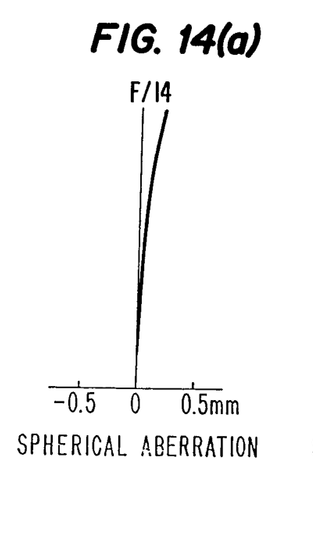
Figure 14B:
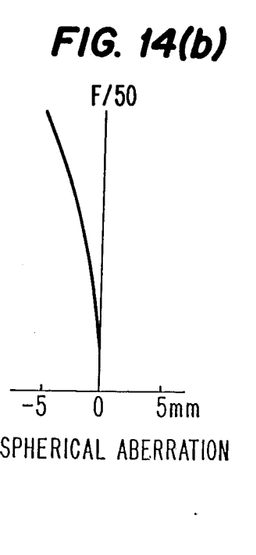
Figure 14C:
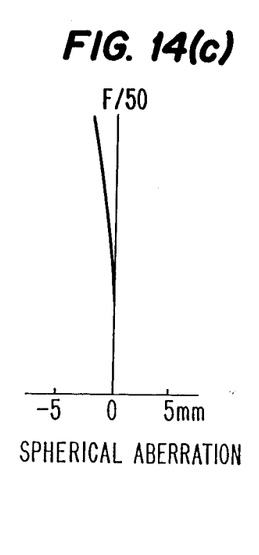
Figure 14D:
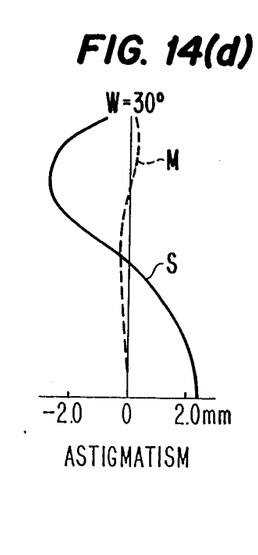
Figure 14E:
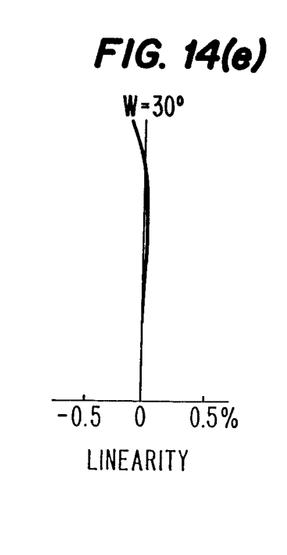

FIGS. 3(a), (b) show an arrangement of the optical elements in the plane parallel to the direction of scan and in the plane perpendicular to the direction of scan, respectively, of a light scanning system according to a second embodiment of this invention. A first converging optical system 5 is comprised of, sequentially from the light source 17, a negative meniscus lens 13 having a convex surface forming the light source, and a positive flat convex cylindrical lens 14. It is designed to converge the light beam in the vicinity of the deflecting surface 6 and, at the same time, generates an over-corrected spherical aberration.

A second converging optical system 11 is comprised of a meniscus spherical lens 8 having a concave surface facing the deflecting surface 6, a meniscus spherical lens 9 having a convex surface facing the deflecting surface, and one toric lens 10, and it focuses the light beam to a scanning spot on the scanning plane 12. This second converging optical system generates an under-corrected spherical aberration in the plane perpendicular to the direction of scan, which is canceled by the over-corrected spherical aberration of the first converging optical system 5.

Incidentally, in FIGS. 2(a), (b) and FIGS. 3(a), (b), the following symbols denote as the following parameters of the present invention:

$r_1, r_2, \ldots, r_m$ (m=11 or 13); radius of curvature of each surface with respect to refraction in the plane parallel to the direction of scan;

$r'_1, r'_2, \ldots, r'_m$ (m=11 or 13): radius of curvature of each surface with respect to refraction in the plane perpendicular to the direction of scan;

$d_1, d_2, \ldots, d_{m-1}$ (m=11 or 13): distance between each adjacent two surfaces; and $n_1, n_2, \ldots, n_s$ (s=5 or 6): refractive index of each lens taken with radiation having a wave length of 790 nm.

Furthermore, by satisfying the following conditions, the characteristics exhibited by the present invention can be further improved.

$$3.8 < f_p/f_v < 5.0 \quad (1)$$

$$0.2 < L/f_p < 0.4 \quad (2)$$

$$0.45 < f_p/r_a < 0.1 \quad (3)$$

where, $f_p$: focal length with respect to refraction in the plane parallel to the direction of scan of the second converging optical system;

$f_v$: focal length with respect to refraction in the plane perpendicular to the direction of scan of the second convergiing optical system;

L: overall length of the lenses of the second converging optical system; and $r_a$: radius of curvature, with respect to refraction in the plane parallel to the direction of scan of the deflecting surface of the third lens from the deflecting surface of the second converging optical system ($r_a$ means $r_{12}$ of Example 2 and $r_{10}$ of Example 2 through 11 shown later)

Condition (1) defines the ratio of the focal length with respect to refraction in the plane parallel to the direction of scan to the focal length with respect to refraction in the plane perpendicular to the direction of scan of the second converging optical system. When exceeding the upper limit or lower limit, correction of astigmatism is difficult, which is an obstacle in the realization of high performance.

Condition (2) defines the overall length of the lenses of the second converging optical system. Parameter set below the lower limit are indicative of an advantageous compact design, but correction of astigmatism becomes difficult. When the parameters are set above the upper limit, the overall length of the second converging optical system increases, and, accordingly, the aperture of the lens having a toric plane increases, which may give rise to a significant cost increase.

Condition (3) is important for ensuring the linearity of scanning. The second converging optical system, with respect to refraction in the plane parallel to the direction of scan, generates a negative distortion characteristic on the deflecting surface end plane of the third lens from the deflecting surface, and produces a favorable linearity in the whole system. If the radius of curvature $r_a$ of this plane exceeds the upper limit or lower limit, it is hard to maintain an excellent degree of linearity.

Hereinafter, examples of practical designs are shown. Example 1 corresponds to the first embodiment shown in FIGS. 2(a), (b), and Examples 2 to 11 correspond to the second embodiment shown in FIGS. 3(a), (b).

EXAMPLE 1 aperture ratio in the plane parallel to the direction of scan=1:49 aperture ratio in the plane perpendicular to the direction of scan=1:49 half deflecting angle=±33°

| | | $f_p = 284.78$ $f_p/f_v = 4.15$ | | | |
|---|---|---|---|---|---|
| | | $L/f_p = 0.31$ $f_p/r_a$ ( $= f_p/r_{12}$) = 0 | | | |
| | $r_1 = \infty$' | $r_1' = 46.587$ | $d_1 = 2.40$ | $n_1 = 1.765299$ |
| | $r_2 = \infty$ | $r_2' = \infty$ | $d_2 = 14.28$ | |
| first converging means | $r_3 = \infty$ | $r_3' = -29.870$ | $d_3 = 2.20$ | $n_2 = 1.510516$ |
| | $r_4 = \infty$ | $r_4' = \infty$ | $d_4 = 33.89$ | |
| | $r_5 = \infty$ | $r_5' = 60.000$ | $d_5 = 3.00$ | $n_3 = 1.765299$ |
| | $r_6 = \infty$ | $r_6' = \infty$ | $d_6 = 51.35$ | |
| deflecting surface | $r_7 = \infty$ | $r_7' = \infty$ | $d_7 = 20.48$ | |
| | $r_8 = -70.606$ | $r_8' = -70.606$ | $d_8 = 17.28$ | $n_4 = 1.765299$ |

-continued $$f_p = 284.78 \ f_p/f_v = 4.15$$
$$L/f_p = 0.31 \ f_p/r_a \ (= f_p/r_{12}) = 0$$

| second converging means | $r_9 = -77.654$ | $r_9' = -77.654$ | $d_9 = 0.66$ | |
|---|---|---|---|---|
| | $r_{10} = 354.042$ | $r_{10}' = 354.042$ | $d_{10} = 14.21$ | $n_5 = 1.532883$ |
| | $r_{11} = 431.786$ | $r_{11}' = 431.786$ | $d_{11} = 39.29$ | |
| | $r_{12} = \infty$ | $r_{12}' = -83.615$ | $d_{12} = 18.19$ | $n_6 = 1.674497$ |
| | $r_{13} = -230.766$ | $r_{13}' = -34.394$ | | |

EXAMPLE 2 aperture ratio in the plane parallel to the direction of scan = 1:49 aperture ratio in the plane perpendicular to the direction of scan = 1:49 half deflecting angle = ±33°

$$f_p = 284.78 \ f_p/f_v = 4.15$$
$$L/f_p = 0.31 \ f_p/r_a \ (= f_p/r_{10}) = 0$$

| first converging means | $r_1 = \infty$ | $r_1' = 21.000$ | $d_1 = 4.00$ | $n_1 = 1.765299$ |
|---|---|---|---|---|
| | $r_2 = \infty$ | $r_2' = 17.545$ | $d_2 = 5.00$ | |
| | $r_3 = \infty$ | $r_3' = 47.389$ | $d_3 = 3.72$ | $n_2 = 1.765299$ |
| | $r_4 = \infty$ | $r_4' = \infty$ | $d_4 = 79.01$ | |
| deflecting means | $r_5 = \infty$ | $r_5' = \infty$ | $d_5 = 20.48$ | |
| | $r_6 = -70.606$ | $r_6' = -70.606$ | $d_6 = 17.28$ | $n_3 = 1.765299$ |
| | $r_7 = -77.654$ | $r_7' = -77.654$ | $d_7 = 0.66$ | |
| | $r_8 = 354.042$ | $r_8' = 354.042$ | $d_8 = 14.21$ | $n_4 = 1.532883$ |
| second converging means | $r_9 = 431.786$ | $r_9' = 431.786$ | $d_9 = 39.29$ | |
| | $r_{10} = \infty$ | $r_{10}' = -83.615$ | $d_{10} = 18.19$ | $n_5 = 1.674497$ |
| | $r_{11} = -230.766$ | $r_{11}' = -34.394$ | | |

EXAMPLE 3 aperture ratio in the plane parallel to the direction of scan = 1:50 aperture ratio in the plane perpendicular to the direction of scan = 1:50 half deflecting angle = ±30°

$$f_p = 287.66 \ f/f = 4.20$$
$$L/f_p = 0.30 \ f_p/r_a \ (= f_p/r_{10}) = -0.15$$

| first converging means | $r_1 = \infty$ | $r_1' = 15.044$ | |
|---|---|---|---|
| | $d_1 = 4.00$ | $n_1' = 1.76530$ | |
| | $r_2 = \infty$ | $r_2' = 12.773$ | |
| | $d_2 = 5.00$ | | |
| | $r_3 = \infty$ | $r_3' = 48.842$ | |
| | $d_3 = 3.72$ | $n_2 = 1.76530$ | |
| | $r_4 = \infty$ | $r_4' = \infty$ | |
| deflecting surface | $d_4 = 73.19$ | | |
| | $r_5 = \infty$ | $r_5' = \infty$ | |
| | $d_5 = 20.00$ | | |
| | $r_6 = -70.189$ | $r_6' = -70.189$ | |
| | $d_6 = 18.85$ | $n_3 = 1.76530$ | |
| | $r_7 = -77.471$ | $r_7' = -77.471$ | |
| | $d_7 = 10.00$ | | |
| | $r_8 = 369.975$ | $r_8' = 369.975$ | |
| second converging means | $d_8 = 6.15$ | $n_4 = 1.53288$ | |
| | $r_9 = 554.244$ | $r_9' = 554.244$ | |
| | $d_9 = 39.51$ | | |
| | $r_{10} = -1859.183$ | $r_{10}' = -78.953$ | |
| | $d_{10} = 12.34$ | $n_5 = 1.67450$ | |
| | $r_{11} = -227.419$ | $r_{11}' = -33.306$ | |

EXAMPLE 4 aperture ratio in the plane parallel to the direction of scan = 1:50 aperture ratio in the plane perpendicular to the direction of scan = 1:50 half deflecting angle = ±30°

$$f_p = 287.66 \ f_p/f_v = 4.13$$
$$L/f_p = 0.32 \ f_p/r_a \ (= f_p/r_{10}) = 0$$

| first converging means | $r_1 = \infty$ | $r_1' = 38.410$ |
|---|---|---|
| | $d_1 = 4.00$ | $n_1 = 1.76530$ |
| | $r_2 = \infty$ | $r_2' = 26.065$ |
| | $d_2 = 5.00$ | |
| | $r_3 = \infty$ | $r_3' = 39.264$ |
| | $d_3 = 3.72$ | $n_2 = 1.765299$ |
| | $r_4 = \infty$ | $r_4' = \infty$ |
| | $d_4 = 86.06$ | |
| deflecting surface | $r_5 = \infty$ | $r_5' = \infty$ |
| | $d_5 = 20.00$ | |
| | $r_6 = -83.583$ | $r_6' = -83.583$ |
| | $d_6 = 25.24$ | $n_3 = 1.73759$ |
| | $r_7 = -87.678$ | $r_7' = -87.678$ |
| | $d_7 = 10.00$ | |
| | $r_8 = 336.361$ | $r_8' = 336.361$ |
| second converging means | $d_8 = 6.00$ | $n_4 = 1.76167$ |
| | $r_9 = 432.403$ | $r_9' = 432.403$ |
| | $d_9 = 39.58$ | |
| | $r_{10} = \infty$ | $r_{10}' = -65.724$ |
| | $d_{10} = 12.00$ | $n_5 = 1.60659$ |
| | $r_{11} = -286.512$ | $r_{11}' = -29.803$ |

EXAMPLE 5 aperture ratio in the plane parallel to the direction of scan = 1:50 aperture ratio in the plane perpendicular to the direction of scan = 1:50 half deflecting angle = ±30°

$$f_p = 287.87 \ f_p/f_v = 3.97$$
$$L/f_p = 0.30 \ f_p/r_a \ (= f_p/r_{10}) = 0$$

| first converging means | $r_1 = \infty$ | $r_1' = 23.564$ |
|---|---|---|
| | $d_1 = 4.05$ | $n_1 = 1.765299$ |
| | $r_2 = \infty$ | $r_2' = 20.286$ |
| | $d_2 = 5.06$ | |
| | $r_3 = \infty$ | $r_3' = 54.574$ |
| | $d_3 = 3.77$ | $n_2 = 1.765299$ |
| | $r_4 = \infty$ | $r_4' = \infty$ |
| | $d_4 = 85.42$ | |
| deflecting surface | $r_5 = \infty$ | $r_5' = \infty$ |
| | $d_5 = 25.00$ | |
| | $r_6 = -72.763$ | $r_6' = -72.763$ |
| | $d_6 = 19.00$ | $n_3 = 1.76167$ |
| | $r_7 = -77.288$ | $r_7' = -77.288$ |
| | $d_7 = 10.00$ | |

-continued $$f_p = 287.87 \ f_p/f_v = 3.97$$
$$L/f_p = 0.30 \ f_p/r_a \ ( = f_p/r_{10}) = 0$$

| | | |
|---|---|---|
| second converging means | $r_8 = 643.375$ | $r_8' = 643.375$ |
| | $d_8 = 11.15$ | $n_4 = 1.5119$ |
| | $r_9 = 2849.379$ | $r_9' = 2849.379$ |
| | $d_9 = 45.00$ | |
| | $r_{10} = \infty$ | $r_{10}' = -82.637$ |
| | $d_{10} = 6.00$ | $n_5 = 1.67450$ |
| | $r_{11} = -306.407$ | $r_{11}' = -34.194$ |

EXAMPLE 6 aperture ratio in the plane parallel to the direction of scan = 1:50
aperture ratio in the plane perpendicular to the direction of scan = 1:50
half deflecting angle = ±30°

$$f_p = 295.12 \ f_p/f_v = 4.38$$
$$L/f_p = 0.27 \ f_p/r_a \ ( = f_p/r_{10}) = -0.055$$

| | | |
|---|---|---|
| first converging means | $r_1 = \infty$ | $r_1' = 23.636$ |
| | $d_1 = 4.55$ | $n_1 = 1.76530$ |
| | $r_2 = \infty$ | $r_2' = 20.007$ |
| | $d_2 = 5.68$ | |
| | $r_3 = \infty$ | $r_3' = 46.669$ |
| | $d_3 = 3.72$ | $n_2 = 1.76530$ |
| | $r_4 = \infty$ | $r_4' = \infty$ |
| | $d_4 = 71.86$ | |
| deflecting surface | $r_5 = \infty$ | $r_5' = \infty$ |
| | $d_5 = 20.00$ | |
| | $r_6 = -65.003$ | $r_6' = -65.003$ |
| | $d_6 = 8.01$ | $n_3 = 1.78506$ |
| | $r_7 = -73.811$ | $r_7' = -73.811$ |
| | $d_7 = 0.23$ | |
| | $r_8 = 607.287$ | $r_8' = 607.287$ |
| second converging means | $d_8 = 12.92$ | $n_4 = 1.510516$ |
| | $r_9 = 407.327$ | $r_9' = 407.327$ |
| | $d_9 = 39.47$ | |
| | $r_{10} = -5379.689$ | $r_{10}' = -117.403$ |
| | $d_{10} = 19.93$ | $n_5 = 1.72367$ |
| | $r_{11} = -167.907$ | $r_{11}' = -37.807$ |

EXAMPLE 7 aperture ratio in the plane parallel to the direction of scan = 1:50
aperture ratio in the plane perpendicular to the direction of scan = 1:50
half deflecting angle = ±30°

$$f_p = 288.01 \ f_p/f_v = 3.98$$
$$L/f_p = 0.34 \ f_p/r_a \ ( = f_p/r_{10}) = 0.014$$

| | | |
|---|---|---|
| first converging means | $r_1 = \infty$ | $r_1' = 25.637$ |
| | $d_1 = 4.83$ | $n_1 = 1.76530$ |
| | $r_2 = \infty$ | $r_2' = 21.020$ |
| | $d_2 = 6.40$ | |
| | $r_3 = \infty$ | $r_3' = 48.017$ |
| | $d_3 = 4.50$ | $n_2 = 1.76530$ |
| | $r_4 = \infty$ | $r_4' = \infty$ |
| | $d_4 = 79.87$ | |
| deflecting surface | $r_5 = \infty$ | $r_5' = \infty$ |
| | $d_5 = 20.00$ | |
| | $r_6 = -68.359$ | $r_6' = -68.359$ |
| | $d_6 = 12.20$ | $n_3 = 1.67450$ |
| | $r_7 = -78.902$ | $r_7' = -78.902$ |
| | $d_7 = 1.74$ | |
| | $r_8 = 740.172$ | $r_8' = 740.172$ |
| second converging means | $d_8 = 23.55$ | $n_4 = 1.65903$ |
| | $r_9 = 574.503$ | $r_9' = 574.503$ |
| | $d_9 = 38.89$ | |
| | $r_{10} = 20901.200$ | $r_{10}' = -149.805$ |
| | $d_{10} = 20.94$ | $n_5 = 1.63512$ |

-continued $$f_p = 288.01 \ f_p/f_v = 3.98$$
$$L/f_p = 0.34 \ f_p/r_a \ ( = f_p/r_{10}) = 0.014$$

| | |
|---|---|
| $r_{11} = -161.094$ | $r_{11}' = -38.452$ |

EXAMPLE 8 aperture ratio in the plane parallel to the direction of scan = 1:50
aperture ratio in the plane perpendicular to the direction of scan = 1:50
half deflecting angle = ±30°

$$f_p = 291.69 \ f_p/f_v = 4.12$$
$$L/f_p = 0.32 \ f_p/r_a \ ( = f_p/r_{10}) = 0;$$

| | | |
|---|---|---|
| first converging means | $r_1 = \infty$ | $r_1' = 25.357$ |
| | $d_1 = 4.83$ | $n_1 = 1.76530$ |
| | $r_2 = \infty$ | $r_2' = 21.316$ |
| | $d_2 = 6.40$ | |
| | $r_3 = \infty$ | $r_3' = 49.817$ |
| | $d_3 = 4.50$ | $n_2 = 1.76530$ |
| | $r_4 = \infty$ | $r_4' = \infty$ |
| | $d_4 = 77.99$ | |
| deflecting surface | $r_5 = \infty$ | $r_5' = \infty$ |
| | $d_5 = 20.00$ | |
| | $r_6 = -67.946$ | $r_6' = -67.946$ |
| | $d_6 = 11.05$ | $n_3 = 1.76167$ |
| | $r_7 = -78.402$ | $r_7' = -78.402$ |
| | $d_7 = 2.66$ | |
| | $r_8 = 743.300$ | $r_8' = 743.300$ |
| second converging means | $d_8 = 22.88$ | $n_4 = 1.65903$ |
| | $r_9 = 542.759$ | $r_9' = 542.759$ |
| | $d_9 = 37.26$ | |
| | $r_{10} = \infty$ | $r_{10}' = -146.768$ |
| | $d_{10} = 19.73$ | $n_5 = 1.67150$ |
| | $r_{11} = -165.713$ | $r_{11}' = -39.239$ |

EXAMPLE 9 aperture ratio in the plane parallel to the direction of scan = 1:50
aperture ratio in the plane perpendicular to the direction of scan = 1:50
half deflecting angle = ±30°

$$f_p = 287.89 \ f_p/f_v = 4.24$$
$$L/f_p = 0.30 \ f_p/r_a \ (= f_p/r_{10}) =$$

| | | |
|---|---|---|
| first converging means | $r_1 = \infty$ | $r_1' = 20.956$ |
| | $d_1 = 4.00$ | $n_1 = 1.76530$ |
| | $r_2 = \infty$ | $r_2' = 17.812$ |
| | $d_2 = 5.00$ | |
| | $r_3 = \infty$ | $r_3' = 46.210$ |
| | $d_3 = 3.72$ | $n_2 = 1.76530$ |
| | $r_4 = \infty$ | $r_4' = \infty$ |
| | $d_4 = 72.19$ | |
| deflecting surface | $r_5 = \infty$ | $r_5' = \infty$ |
| | $d_5 = 20.48$ | |
| | $r_6 = -68.143$ | $r_6' = -68.143$ |
| | $d_6 = 20.64$ | $n_3 = 1.78506$ |
| | $r_7 = -80.684$ | $r_7' = -80.684$ |
| | $d_7 = 6.77$ | |
| | $r_8 = 918.262$ | $r_8' = 918.262$ |
| second converging means | $d_8 = 7.38$ | $n_4 = 1.53288$ |
| | $r_9 = -4001.818$ | $r_9' = -4001.818$ |
| | $d_9 = 37.59$ | |
| | $r_{10} = -1047.105$ | $r_{10}' = -85.234$ |
| | $d_{10} = 14.29$ | $n_5 = 1.67450$ |
| | $r_{11} = -195.914$ | $r_{11}' = -34.629$ |

EXAMPLE 10 aperture ratio in the plane parallel to the direction of scan = 1:50 aperture ratio in the plane perpendicular to the direction of scan=1:50
half deflecting angle=±30°

| $f_p = 287.69$ $f_p/f_v = 4.49$ | |
|---|---|
| $L/f_p = 0.28$ $f_p/r_a (= f_p/r_{10}) =$ | |

|  |  |  |
|---|---|---|
|  | $r_1 = \infty$ | $r_1' = 21.193$ |
|  | $d_1 = 4.00$ | $n_1 = 1.76530$ |
|  | $r_2 = \infty$ | $r_2' = 17.851$ |
| first converging means | $d_2 = 5.00$ | |
|  | $r_3 = \infty$ | $r_3' = 41.662$ |
|  | $d_3 = 3.72$ | $n_2 = 1.76530$ |
|  | $r_4 = \infty$ | $r_4' = \infty$ |
|  | $d_4 = 65.06$ | |
| deflecting surface | $r_5 = \infty$ | $r_5' = \infty$ |
|  | $d_5 = 20.48$ | |
|  | $r_6 = -65.855$ | $r_6' = -65.855$ |
|  | $d_6 = 22.11$ | $n_3 = 1.78506$ |
|  | $r_7 = -82.458$ | $r_7' = -82.458$ |
|  | $d_7 = 0.00$ | |
|  | $r_8 = 11290.889$ | $r_8' = 11290.889$ |
| second converging means | $d_8 = 9.89$ | $n_4 = 1.78506$ |
|  | $r_9 = -1046.936$ | $r_9' = -1046.936$ |
|  | $d_9 = 34.50$ | |
|  | $r_{10} = -746.887$ | $r_{10}' = -78.255$ |
|  | $d_{10} = 15.00$ | $n_5 = 1.78506$ |
|  | $r_{11} = -192.977$ | $r_{11}' = -36.101$ |

EXAMPLE 11 aperture ratio in the plane parallel to the direction of scan=1:50
aperture ratio in the plane perpendicular to the direction of scan=1:50
half deflecting angle=±30°

| $f_p = 287.66$ $f_p/f_v = 4.35$ | |
|---|---|
| $L/f_p = 0.30$ $f_p/r_a (= f_p/r_{10}) = 0$ | |

|  |  |  |
|---|---|---|
|  | $r_1 = \infty$ | $r_1' = 21.004$ |
|  | $d_1 = 4.00$ | $n_1 = 1.76530$ |
|  | $r_2 = \infty$ | $r_2' = 17.845$ |
| first converging means | $d_2 = 5.00$ | |
|  | $r_3 = \infty$ | $r_3' = 45.422$ |
|  | $d_3 = 3.72$ | $n_2 = 1.76530$ |
|  | $r_4 = \infty$ | $r_4' = \infty$ |
|  | $d_4 = 70.73$ | |
|  | $r_5 = \infty$ | $r_5' = \infty$ |
| deflecting surface | $d_5 = 20.48$ | |
|  | $r_6 = -68.363$ | $r_6' = -68.363$ |
|  | $d_6 = 16.61$ | $n_3 = 1.78506$ |
|  | $r_7 = -77.695$ | $r_7' = -77.695$ |
|  | $d_7 = 0.00$ | |
|  | $r_8 = 11425.394$ | $r_8' = 11425.394$ |
| second converging means | $d_8 = 17.01$ | $n_4 = 1.78506$ |
|  | $r_9 = -8531.994$ | $r_9' = -8531.994$ |
|  | $d_9 = 35.96$ | |
|  | $r_{10} = \infty$ | $r_{10}' = -89.050$ |
|  | $d_{10} = 16.53$ | $n_5 = 1.67450$ |
|  | $r_{11} = -208.951$ | $r_{11}' = -34.131$ |

FIGS. 4 through 14 show characteristic curves of the above Examples 1 through 11, in each of which (a) relates to the spherical aberration in the plane perpendicular to the direction of scan of the first converging optical system, (b) to the spherical aberration in the plane perpendicular to the direction of scan of the second converging optical system, (c) to the spherical aberration in the plane perpendicular to the direction of scan of the whole system, (d) to the astigmatism, and (e) to the characteristics of linearity of scan. Furthermore, F denotes F number, ω denotes half deflecting angle, S denotes sagittal aberration, and M denotes meridional aberration.

As apparent from FIGS. 4 through 14, the residual aberration of the whole system is remarkably corrected, the aperture ratio is large, and the deflecting angle is large. As the result of this, the light scanning system of the invention can exhibit a highly accurate converging performance facilitated by a simple structure.

What is claimed is:

1. A light scanning system comprising:
   a light source for emitting a light beam;
   a first converging means for converging the light beam emitted from the light source to a linear image;
   a deflecting means having a deflecting surface for reflecting the converged light beam and for deflecting the reflected light beam in a direction of scan, said deflecting surface located from said first converging means at a position substantially coinciding with the location at which the line image is formed by said first converging means; and
   a second converging means for converging the light beam reflected from the deflecting surface of the deflecting means to a light spot on a scanning plane, the light spot moving on the scanning plane in the direction of scan as the reflected light beam is deflected by said deflecting means,
   said second converging means for correcting aberration in a plane parallel to the direction of scan and generating an under-corrected aberration in a plane perpendicular to the direction of scan, and
   said first converging means having a unidirectional convergent optical power in the plane perpendicular to the direction of scan and generating an over-corrected aberration in the plane perpendicular to the direction of scan for compensating the under-corrected aberration generated by the second converging means whereby spherical aberration is corrected by said first and said second converging means.

2. The system of claim 1, wherein the deflecting surface and the scannning plane are in conjugate relationship to each other in the plane perpendicular to the direction of scan.

3. The system of claim 1, wherein the first converging means comprises a positive cylindrical first lens, a negative cylindrical second lens and a positive cylindrical third lens sequentially arranged in the foregoing order in a direction extending away from the light source.

4. The system of claim 1, wherein the first converging means comprises a meniscus negative cylindrical first lens having a convex surface facing the light source and a positive cylindrical second lens, arranged sequentially in the foregoing order in a direction extending away from the light source.

5. The system of claim 1, wherein the second converging means comprises a spherical first lens, a spherical second lens and a third lens having at least a toric surface, arranged sequentially in the foregoing order in a direction extending away from the deflecting surface.

6. The system of claim 1, wherein the second converging means comprises a meniscus first lens having a concave surface facing the deflecting surface, a meniscus second lens having a convex surface facing the first lens and a third lens having at least a toric surface, arranged sequentially in the foregoing order in a direction extending away from the deflecting surface and toward the scanning plane.

7. The system of clim 1, wherein the second converging means comprises a series of lenses disposed between the scanning plane and the deflecting surface, and wherein the following conditions are substantially satisfied:

$$3.8 < f_p/f_v < 5.0$$

$$0.2 < L/f_p < 0.4$$

$$-0.45 < f_p/r_a < 0.1$$

where $f_p$ denotes a focal length of the second converging means with respect to refraction in the plane parallel to the direction of scan; $f_v$, a focal length of the second converging means with respect to refraction in the plane perpendicular to the direction of scan; L, a length of the second converging means; and $r_a$, a radius of curvature with respect to refraction in the plane parallel to the direction of scan of a surface, facing toward the deflecting surface, of the lens of the second converging means that is closest to the scanning plane.

8. The system of claim 1, having an aperture ratio of 1:49 in a plane parallel to the direction of scan, an aperture ratio of 1:49 in the plane perpendicular to the direction of scan and a half deflecting angle of 33°, wherein the first converging means comprises first, second and third lenses which are sequentially arranged in the foregoing order in a direction extending away from the light source, and the second converging means comprises fourth, fifth and sixth lenses which are sequentially arranged in the foregoing order in a direction extending away from the deflecting surface, and wherein the following conditions are substantially satisfied:

| | $f_p = 284.78$ $f_p/f_v = 4.15$ $L/f_p = 0.31$ $f_p/r_{12} = 0$ | | | |
|---|---|---|---|---|
| first converging means | $r_1 = \infty$ | $r_1' = 46.587$ | $d_1 = 2.40$ | $n_1 = 1.765299$ |
| | $r_2 = \infty$ | $r_2' = \infty$ | $d_2 = 14.28$ | |
| | $r_3 = \infty$ | $r_3' = -29.870$ | $d_3 = 2.20$ | $n_2$ 1.510516 |
| | $r_4 = \infty$ | $r_4' = \infty$ | $d_4 = 33.89$ | |
| | $r_5 = \infty$ | $r_5' = 60.000$ | $d_5 = 3.00$ | $n_3 = 1.765299$ |
| | $r_6 = \infty$ | $r_6' = \infty$ | $d_6 = 51.35$ | |
| deflecting surface | $r_7 = \infty$ | $r_7' = \infty$ | $d_7 = 20.48$ | |
| second converging means | $r_8 = -70.606$ | $r_8' = -70.606$ | $d_8 = 17.28$ | $n_4 = 1.765299$ |
| | $r_9 = -77.654$ | $r_9' = -77.654$ | $d_9 = 0.66$ | |
| | $r_{10} = 354.042$ | $r_{10}' = 354.042$ | $d_{10} = 14.21$ | $n_5 = 1.532833$ |
| | $r_{11} = 431.786$ | $r_{11}' = 431.786$ | $d_{11} = 39.29$ | |
| | $r_{12} = \infty$ | $r_{12}' = -83.615$ | $d_{12} = 18.19$ | $n_6$ 1.674497 |
| | $r_{13} = -230.766$ | $r_{13}' = -34.394$ | | | where $f_p$ denotes a focal length of the second converging means with respect to refraction in the plane parallel to the direction of scan; $f_v$m a focal length of the second converging means with respect to refraction in the plane perpendicular to the direction of scan; L, a length of the second converging means; $r_1$ through $r_{13}$, respective radii of curvature with respect to refraction in the plane parallel to the direction of scan of the surfaces of the lenses comprising the converging means as taken in sequence in the direction away from the light source and then in the direction extending away from the deflecting surface; $r_1'$ through $r_{13}'$, respective radii of curvature with respect to refraction in the plane perpendicular to the direction of scan of each of the surfaces as taken in said sequence; $d_1$ through $d_{12}$, a distance between each adjacent two of the surfaces as taken in said sequence; and $n_1$ through $n_6$, an index of refraction at a wavelength of 790 nm of each of the lenses in said sequence.

9. The system of claim 1, having an aperature ratio of 1:49 in a plane parallel to the direction of scan, an aperture ratio of 1:49 in the plane perpendicular to the direction of scan and a half deflecting angle of 33°, wherein the first converging means comprises first and second lenses which are sequentially arranged in the foregoing order in a direction extending away from the light source, and the second converging means comprises third, fourth and fifth lenses which are sequentially arranged in the foregoing order in a direction extending away from the deflecting surface, and wherein the following conditions are substantially satisfied:

| | $f_p = 284.78$ $f_p/f_v = 4.15$ $L/f_p = 0.31$ $f_p/r_{10} = 0$ | | | |
|---|---|---|---|---|
| first converging means | $r_1 = \infty$ | $r_1' = 21.000$ | $d_1 = 4.00$ | $n_1 = 1.765299$ |
| | $r_2 = \infty$ | $r_2' = 17.545$ | $d_2 = 5.00$ | |
| | $r_3 = \infty$ | $r_3' = 47.389$ | $d_3 = 3.72$ | $n_2 = 1.765299$ |
| | $r_4 = \infty$ | $r_4' = \infty$ | $d_4 = 79.01$ | |
| deflecting means | $r_5 = \infty$ | $r_5' = \infty$ | $d_5 = 20.48$ | |
| second converging means | $r_6 = -70.606$ | $r_6' = -70.606$ | $d_6 = 17.28$ | $n_3 = 1.765299$ |
| | $r_7 = -77.654$ | $r_7' = -77.654$ | $d_7 = 0.66$ | |
| | $r_8 = 354.042$ | $r_8' = 354.042$ | $d_8 = 14.21$ | $n_4 = 1.532883$ |
| | $r_9 = 431.786$ | $r_9' = 431.786$ | $d_9 = 39.29$ | |
| | $r_{10} = \infty$ | $r_{10}' = -83.615$ | $d_{10} = 18.19$ | $n_5 = 1.674497$ |
| | $r_{11} = -230.766$ | $r_{11}' = -34.394$ | | | where $f_p$ denotes a focal length of the second converging means with respect to refraction in the plane parallel to the direction of scan; $f_v$, a focal length of the second converging means with respect to refraction in the plane perpendicular to the direction of scan; L, a length of the second converging means; $r_1$ through $r_{11}$, respective radii of curvature with respect to refraction in the plane parallel to the direction of scan of the surfaces of the lenses comprising the converging means as taken in sequence in the direction extending away from the light source and then in the direction extending away from the deflecting surface; $r_1'$ through $r_{11}'$, respective radii of curvature with respect to refraction in the plane perpendicular to the direction of scan of each of the surfaces as taken in said sequence; and $d_1$ through $d_{10}$, a distance between each adjacent two of the surfaces as taken in said sequence; and $n_1$ through $n_5$, an index of refraction at a wavelength of 790 nm of each of the lenses in said sequence.

10. The system of claim 1, having an aperture ratio of 1:50 in a plane parallel to the direction of scan, an aperture ratio of 1:50 in the plane perpendicular to the direction of scan and a half deflecting angle of 30°, wherein the first converging means comprises first and second lenses which are sequentially arranged in the foregoing order in a direction extending away from the light source, and the second converging means comprises third, fourth and fifth lenses which are sequentially arranged in the foregoing order in a direction extending away from the deflecting surface, and wherein the following conditions are substantially satisfied:

| | $f_p = 287.66$ $\quad f_p/f_v = 4.20$ | |
|---|---|---|
| | $L/f_p = 0.30$ $\quad f_p/r_{10} = -0.15$ | |
| first converging means | $r_1 = \infty$ | $r_1' = 15.044$ |
| | $d_1 = 4.00$ | $n_1 = 1.76530$ |
| | $r_2 = \infty$ | $r_2' = 12.773$ |
| | $d_2 = 5.00$ | |
| | $r_3 = \infty$ | $r_3' = 48.842$ |
| | $d_3 = 3.72$ | $n_2 = 1.76530$ |
| | $r_4 = \infty$ | $r_4' = \infty$ |
| | $d_4 = 73.19$ | |
| deflecting surface | $r_5 = \infty$ | $r_5' = \infty$ |
| | $d_5 = 20.00$ | |
| second converging means | $r_6 = -70.189$ | $r_6' = -70.189$ |
| | $d_6 = 18.85$ | $n_3 = 1.76530$ |
| | $r_7 = -77.471$ | $r_7' = -77.471$ |
| | $d_7 = 10.00$ | |
| | $r_8 = 369.975$ | $r_8' = 369.975$ |
| | $d_8 = 6.15$ | $n_4 = 1.53288$ |
| | $r_9 = 554.244$ | $r_9' = 554.244$ |
| | $d_9 = 39.51$ | |
| | $r_{10} = -1859.183$ | $r_{10}' = 78.953$ |
| | $d_{10} = 12.34$ | $n_5 = 1.67450$ |
| | $r_{11} = -227.419$ | $r_{11}' = -33.306$ | where $f_p$ denotes a focal length of the second converging means with respect to refraction in the plane parallel to the direction of scan; $f_v$, a focal length of the second converging means with respect to refraction in the plane perpendicular to the direction of scan; L, a length of the second converging means; $r_1$ through $r_{11}$, respective radii of curvature with respect to the refraction in the plane parallel to the direction of scan of the surfaces of the lenses comprising the converging means as taken in sequence in the direction extending away from the light source and then in the direction extending away from the deflecting surface; $r_1'$ through $r_{11}'$, respective radii of curvature with respect to refraction in the plane perpendicular to the direction of scan of each of the surfaces as taken in said sequence; $d_1$ through $d_{10}$, a distance between each adjacent two of the surfaces as taken in said sequence; and $n_1$ through $n_5$, an index of refraction at a wavelength of 790 nm of each of the lenses in said sequence.

11. The system of claim 1, having an aperture ratio of 1:50 in a plane parallel to the direction of scan, an aperture ratio of 1:50 in the plane perpendicular to the direction of scan and a half deflecting angle of 30°, wherein the first converging means comprises first and second lenses which are sequentially arranged in the foregoing order in a direction extending away from the light source, and the second conveying means comprises third, fourth and fifth lenses which are sequentially arranged in the foregoing order in a direction extending away from the deflecting surface, and wherein the following conditions are substantially satisfied:

| | $f_p = 287.66$ | $f_p/f_v = 4.13$ |
|---|---|---|
| | $L/f_p = 0.32$ | $f_p/r_{10} = 0$ |
| first converging means | $r_1 = \infty$ | $r_1' = 38.410$ |
| | $d_1 = 4.00$ | $n_1 = 1.76530$ |
| | $r_2 = \infty$ | $r_2' = 26.065$ |
| | $d_2 = 5.00$ | |
| | $r_3 = \infty$ | $r_3' = 39.264$ |
| | $d_3 = 3.72$ | $n_2 = 1.765299$ |
| | $r_4 = \infty$ | $r_4' = \infty$ |
| | $d_4 = 86.06$ | |
| deflecting surface | $r_5 = \infty$ | $r_5' = \infty$ |
| | $d_5 = 20.00$ | |
| second converging means | $r_6 = -83.583$ | $r_6' = -83.583$ |
| | $d_6 = 25.24$ | $n_3 = 1.73759$ |
| | $r_7 = -87.678$ | $r_7' = -87.678$ |
| | $d_7 = 10.00$ | |
| | $r_8 = 336.361$ | $r_8' = 336.361$ |
| | $d_8 = 6.00$ | $n_4 = 1.76167$ |
| | $r_9 = 432.403$ | $r_9' = 432.403$ |
| | $d_9 = 39.58$ | |
| | $r_{10} = \infty$ | $r_{10}' = -65.724$ |
| | $d_{10} = 12.00$ | $n_5 = 1.60659$ |
| | $r_{11} = -286.512$ | $r_{11}' = -29.803$ | where $f_p$ denotes a focal length of the second converging means with respect to refraction in the plane parallel to the direction of scan; $f_v$, a local length of the second converging means with respect to refraction in the plane perpendicular to the direction of scan; L, a length of the second converging means with respect to refraction in the plane perpendicular to the direction of scan; L, a length of the second converging means; $r_1$ through $r_{11}$, respective radii of curvature with respect to refraction in the plane parallel to the direction of scan of the surfaces of the lenses comprising the converging means as taken in sequence in the direction extending away from the light source and then in the direction extending away from the deflecting surface; $r_1'$ through $r_{11}'$ respective radii of curvature with respect to refraction in the plane perpendicular to the direction of scan of each of the surfaces as taken in said sequence; $d_1$ through $d_{10}$, a distance between each adjacent two of the surfaces as taken in said sequence; and $n_1$ through $n_5$, an index of refraction at a wavelength of 790 nm of each of the lenses in said sequence.

12. The system of claim 1, having an aperture ratio of 1:50 in a plane parallel to the direction of scan, an aperture ratio of 1:50 in the plane perpendicular to the direction of scan and a half deflecting angle of 30°, wherein the first converging means comprises first and second lenses which are sequentially arranged in the foregoing order in a direction extending away from the light source, and the second converging means comprises third, fourth and fifth lenses which are sequentially arranged in the foregoing order in a direction extending away from the deflecting surface, and wherein the following conditions are substantially satisfied:

| | $f_p = 287.87$ | $f_p/f_v = 3.97$ |
|---|---|---|
| | $L/f_p = 0.30$ | $f_p/r_{10} = 0$ |
| first converging means | $r_1 = \infty$ | $r_1' = 23.564$ |
| | $d_1 = 4.05$ | $n_1 = 1.765299$ |
| | $r_2 = \infty$ | $r_2' = 20.286$ |
| | $d_2 = 5.06$ | |
| | $r_3 = \infty$ | $r_3' = 54.574$ |
| | $d_3 = 3.77$ | $n_2 = 1.765299$ |
| | $r_4 = \infty$ | $r_4' = \infty$ |
| | $d_4 = 85.42$ | |

-continued

| | | |
|---|---|---|
| deflecting surface | $r_5 = \infty$ | $r_5' = \infty$ |
| | $d_5 = 25.00$ | |
| second converging means | $r_6 = -72.763$ | $r_6' = -72.763$ |
| | $d_6 = 19.00$ | $n_3 = 1.76167$ |
| | $r_7 = -77.288$ | $r_7' = -77.288$ |
| | $d_7 = 10.00$ | |
| | $r_8 = 643.375$ | $r_8' = 643.375$ |
| | $d_8 = 11.15$ | $n_4 = 1.5119$ |
| | $r_9 = 2849.379$ | $r_9' = 2849.379$ |
| | $d_9 = 45.00$ | |
| | $r_{10} = \infty$ | $r_{10}' = -82.637$ |
| | $d_{10} = 6.00$ | $n_5 = 1.67450$ |
| | $r_{11} = -306.407$ | $r_{11}' = -34.194$ | where $f_p$ denotes a focal length of the second converging means with respect to refraction in the plane parallel to the direction of scan; $f_v$, a focal length of the second converging means with respect to refraction in the plane perpendicular to the direction of scan; L, a length of the second converging means; $r_1$ through $r_{11}$, respective radii of curvature with respect to refraction in the plane parallel to the direction of scan of the surfaces of the lenses comprising the converging means as taken in sequence in the direction extending away from the light source and then in the direction extending away from the deflecting surface; $r_1'$ through $r_{11}'$ respective radii of curvature with respect to refraction in the plane perpendicular to the direction of scan of each of the surfaces as taken in said sequence; $d_1$ through $d_{10}$, a distance between each adjacent two of the surfaces as taken in said sequence; and $n_1$ through $n_5$, an index of refraction at a wavelength of 790 nm of each of the lenses in said sequence.

13. The system of claim 1, having an aperture ratio of 1:50 in a plane parallel to the direction of scan, an aperture ratio of 1:50 in the plane perpendicular to the direction of scan and a half deflecting angle of 30°, wherein the first converging means comprises first and second lenses which are sequentially arranged in the foregoing order in a direction extending away from the light source, and the second converging means comprises third, fourth and fifth lenses which are sequentially arranged in the foregoing order in a direction extending away from the deflecting surface, and wherein the following conditions are substantially satisfied:

| $f_p = 295.12$ | $f_p/f_v = 4.38$ |
|---|---|
| $L/f_p = 0.27$ | $f_p/r_{10} = -0.055$ |

| | | |
|---|---|---|
| first converging means | $r_1 = \infty$ | $r_1' = 23.636$ |
| | $d_1 = 4.55$ | $n_1 = 1.76530$ |
| | $r_2 = \infty$ | $r_2' = 20.007$ |
| | $d_2 = 5.68$ | |
| | $r_3 = \infty$ | $r_3' = 46.669$ |
| | $d_3 = 3.72$ | $n_2 = 1.76530$ |
| | $r_4 = \infty$ | $r_4' = \infty$ |
| | $d_4 = 71.86$ | |
| deflecting surface | $r_5 = \infty$ | $r_5' = \infty$ |
| | $d_5 = 20.00$ | |
| second converging means | $r_6 = -65.003$ | $r_6' = -65.003$ |
| | $d_6 = 8.01$ | $n_3 = 1.78506$ |
| | $r_7 = -73.811$ | $r_7' = -73.811$ |
| | $d_7 = 0.23$ | |
| | $r_8 = 607.287$ | $r_8' = 607.287$ |
| | $d_8 = 12.92$ | $n_4 = 1.510516$ |
| | $r_9 = 407.327$ | $r_9' = 407.327$ |
| | $d_9 = 39.47$ | |
| | $r_{10} = -5379.689$ | $r_{10}' = -117.403$ |
| | $d_{10} = 19.93$ | $n_5 = 1.72367$ |
| | $r_{11} = -167.907$ | $r_{11}' = -37.807$ | where $f_p$ denotes a focal length of the second converging means with respect to refraction in the plane parallel to the direction of scan; $f_v$, a focal length of the second converging means with respect to refraction in the plane perpendicular to the directio of scan; L, a length of the second converging means; $r_1$ through $r_{11}$, respective radii of curvature with respect to refraction in the plane parallel to the direction of scan of the surfaces of the lenses comprising the converging means as taken in sequence in the direction extending away from the light source and then in the direction extending away from the deflecting surface; $r_1'$ through $r_{11}'$, respective radii of curvature with respect to refraction in the plane perpendicular to the direction of scan of each of the surfaces as taken in said sequence; and $d_1$ through $d_{10}$, a distance between each adjacent two of the surfaces are taken in said sequence; and $n_1$ through $n_5$, an index of refraction at a wavelength of 790 nm of each of the lenses in said sequence.

14. The system of claim 1, having an aperture ratio of 1:50 in a plane parallel to the direction of scan, an aperture ratio of 1:50 in the plane perpendicular to the direction of scan and a half deflecting angle of 30°, wherein the first converging means comprises first and second lenses which are sequentially arranged in the foregoing order in a direction extending away from the light source, and the second converging means comprises third, fourth and fifth lenses which are sequentially arranged in the foregoing order in a direction extending away from the deflecting surface, and wherein the following conditions are substantially satisfied:

| $f_p = 288.01$ | $f_p/f_v = 3.98$ |
|---|---|
| $L/f_p = 0.34$ | $f_p/r_{10} = 0.014$ |

| | | |
|---|---|---|
| first converging means | $r_1 = \infty$ | $r_1' = 25.637$ |
| | $d_1 = 4.83$ | $n_1 = 1.76530$ |
| | $r_2 = \infty$ | $r_2' = 21.020$ |
| | $d_2 = 6.40$ | |
| | $r_3 = \infty$ | $r_3' = 48.017$ |
| | $d_3 = 4.50$ | $n_2 = 1.76530$ |
| | $r_4 = \infty$ | $r_4' = \infty$ |
| | $d_4 = 79.87$ | |
| deflecting surface | $r_5 = \infty$ | $r_5' = \infty$ |
| | $d_5 = 20.00$ | |
| second converging means | $r_6 = -68.359$ | $r_6' = -68.359$ |
| | $d_6 = 12.20$ | $n_3 = 1.67450$ |
| | $r_7 = -78.902$ | $r_7' = -78.902$ |
| | $d_7 = 1.74$ | |
| | $r_8 = 740.172$ | $r_8' = 740.172$ |
| | $d_8 = 23.55$ | $n_4 = 1.65903$ |
| | $r_9 = 574.503$ | $r_9' = 574.503$ |
| | $d_9 = 38.89$ | |
| | $r_{10} = 20901.200$ | $r_{10}' = -149.805$ |
| | $d_{10} = 20.94$ | $n_5 = 1.63512$ |
| | $r_{11} = -161.094$ | $r_{11}' = -38.452$ | where $f_p$ denotes a focal length of the second converging means with respect to refraction in the plane parallel to the direction of scan; $f_v$, a focal length of the second converging means with respect to refraction in the plane perpendicular to the direction of scan; L, a length of second converging means; $r_1$ through $r_{11}$, respective radii of curvature with respect to refraction in the plane parallel to the direction of scan of the surfaces of the lenses comprising the converging means as taken in sequence in the direction extending away from the light source and then in the direction extending away from the deflecting surface; $r_1'$ through $r_{11}'$, respective radii of curvature with respect to refraction in the plane perpendicular to the direction of scan of each of the surfaces as taken in said sequence; and $d_1$ through $d_{10}$, a distance between each adjacent two of the surfaces are taken in said sequence; and $n_1$ through $n_5$, an index of refraction at a wavelength of 790 nm of each of the lenses in said sequence.

15. The system of claim 1, having an aperture ration of 1:50 in a plane parallel to the direction of scan, an aperture ratio of 1:50 in the plane perpendicular to the direction of scan and a half deflecting angle of 30°, wherein the first conveying means comprises first and second lenses which are sequentially arranged in the foregoing order in a direction extending away from the light source, and the second converging means comprises third, fourth and fifth lenses which are sequentially arranged in the foregoing order in a direction extending away from the deflecting surface, and wherein the following conditions are substantially satisfied:

| $f_p = 291.69$ | $f_p/f_v = 4.12$ | |
|---|---|---|
| $L/f_p = 0.32$ | $f_p/r_{10} = 0$ | |
| first converging means | $r_1 = \infty$ | $r_1' = 25.357$ |
| | $d_1 = 4.83$ | $n_1 = 1.76530$ |
| | $r_2 = \infty$ | $r_2' = 21.316$ |
| | $d_2 = 6.40$ | |
| | $r_3 = \infty$ | $r_3' = 49.817$ |
| | $d_3 = 4.50$ | $n_2 = 1.76530$ |
| | $r_4 = \infty$ | $r_4' = \infty$ |
| | $d_4 = 77.99$ | |
| deflecting surface | $r_5 = \infty$ | $r_5' = \infty$ |
| | $d_5 = 20.00$ | |
| second converging means | $r_6 = -67.946$ | $r_6' = -67.946$ |
| | $d_6 = 11.05$ | $n_3 = 1.76167$ |
| | $r_7 = -78.402$ | $r_7' = -78.402$ |
| | $d_7 = 2.66$ | |
| | $r_8 = 743.300$ | $r_8' = 743.300$ |
| | $d_8 = 22.88$ | $n_4 = 1.65903$ |
| | $r_9 = 542.759$ | $r_9' = 542.759$ |
| | $d_9 = 37.26$ | |
| | $r_{10} = \infty$ | $r_{10}' = -146.768$ |
| | $d_{10} = 19.73$ | $n_5 = 1.67450$ |
| | $r_{11} = -165.713$ | $r_{11}' = -39.239$ | where $f_p$ denotes a focal length the second converging means with respect to refraction in the plane parallel to the direction of scan; $f_v$, a focal length of the second converging means with respect to refraction in the plane perpendicular to the direction of scan; L, a length of the second converging means; $r_1$ through $r_{11}$, respective radii of curvature with respect to refraction in the plane parallel to the direction of scan of the surfaces of the lenses comprising the converging means as taken in sequence in the direction extending away from the light source and then in the direction extending away from the deflecting surface; $r_1'$ through $r_{11}'$, respective radii of curvature with respect to refraction in the plane perpendicular to the direction of scan of each of the surfaces as taken in said sequence; and $d_1$ through $d_{10}$, a distance between each adjacent two of the surfaces as taken in said sequence; and $n_1$ through $n_5$, an index of refraction at a wavelength of 790 nm of each of the lenses in said sequence.

16. The system of claim 1, having an aperture ratio of 1:50 in a plane parallel to the direction of scan, an aperture ratio of 1:50 in the plane perpendicular to the direction of scan and a half deflecting angle of 30°, wherein the first converging means comprises first and second lenses which are sequentially arranged in the foregoing order in a direction extending away from the light source, and the second converging means comprises third, fourth and fifth lenses which are sequentially arranged in the foregoing order in a direction extending away from the deflecting surface, and wherein the following conditions are substantially satisfied:

| $f_p = 287.89$ | $f_p/f_v = 4.24$ | |
|---|---|---|
| $L/f_p = 0.30$ | $f_p/r_{10} = -0.27$ | |
| first converging means | $r_1 = \infty$ | $r_1' = 20.956$ |
| | $d_1 = 4.00$ | $n_1 = 1.76530$ |
| | $r_2 = \infty$ | $r_2' = 17.812$ |
| | $d_2 = 5.00$ | |
| | $r_3 = \infty$ | $r_3' = 46.210$ |
| | $d_3 = 3.72$ | $n_2 = 1.76530$ |
| | $r_4 = \infty$ | $r_4' = \infty$ |
| | $d_4 = 72.19$ | |
| deflecting surface | $r_5 = \infty$ | $r_5' = \infty$ |
| | $d_5 = 20.48$ | |
| second converging means | $r_6 = -68.143$ | $r_6' = -68.143$ |
| | $d_6 = 20.64$ | $n_3 = 1.78506$ |
| | $r_7 = -80.684$ | $r_7' = -80.684$ |
| | $d_7 = 6.77$ | |
| | $r_8 = 918.262$ | $r_8' = 918.262$ |
| | $d_8 = 7.38$ | $n_4 = 1.53288$ |
| | $r_9 = -4001.818$ | $r_9' = -4001.818$ |
| | $d_9 = 37.59$ | |
| | $r_{10} = -1047.105$ | $r_{10}' = -85.234$ |
| | $d_{10} = 14.29$ | $n_5 = 1.67450$ |
| | $r_{11} = -195.914$ | $r_{11}' = -34.629$ | where $f_p$ denotes a focal length of the second converging means with respect to refraction in the plane parallel to the direction of scan; $f_v$, a focal length of the second converging means with respect to refraction in the plane perpendicular to the direction of scan; L, a length of the second converging means; $r_1$ through $r_{11}$, respective radii of curvature with respect to refraction in the plane parallel to the direction of scan of the surfaces of the lenses comprising the converging means as taken in sequence in the direction extending away from the light source and then in the direction extending away from the deflecting surface; $r_1'$ through $r_{11}'$, respective radii of curvature with respect to refraction in the plane perpendicular to the direction of scan of each of the surfaces as taken in said sequence; and $d_1$ through $d_{10}$, a distance between each adjacent two of the surfaces as taken in said sequence; and $n_1$ through $n_5$, an index of refraction at a wavelength of 790 nm of each of the lenses in said sequence.

17. The system of claim 1, having an aperture ratio of 1:50 in a plane parallel to the direction of scan, an aperture ratio of 1:50 in the plane perpendicular to the direction of scan and a half deflecting angle of 30°, wherein the first converging means comprises first and second lenses which are sequentially arranged in the foregoing order in a direction extending away from the light source, and the second converging means comprises third, fourth and fifth lenses which are sequentially arranged in the foregoing order in a direction extending away from the deflecting surface, and wherein the following conditions are substantially satisfied:

| $f_p = 298.69$ | $f_p/f_v = 4.49$ | |
|---|---|---|
| $L/f_p = 0.28$ | $f_p/r_{10} = -0.39$ | |
| first converging means | $r_1 = \infty$ | $r_1' = 21.193$ |
| | $d_1 = 4.00$ | $n_1 = 1.76530$ |
| | $r_2 = \infty$ | $r_2' = 17.851$ |
| | $d_2 = 5.00$ | |
| | $r_3 = \infty$ | $r_3' = 41.662$ |
| | $d_3 = 3.72$ | $n_2 = 1.76530$ |
| | $r_4 = \infty$ | $r_4' = \infty$ |
| | $d_4 = 65.06$ | |
| deflecting surface | $r_5 = \infty$ | $r_5' = \infty$ |
| | $d_5 = 20.48$ | |
| | $r_6 = -65.855$ | $r_6' = -65.855$ |

-continued

| | | | |
|---|---|---|---|
| second converging means | $d_6 = 22.11$ | $n_3 = 1.78506$ | |
| | $r_7 = -82.458$ | $r_7' = -82.458$ | |
| | $d_7 = 0.00$ | | |
| | $r_8 = 11290.889$ | $r_8' = 11290.889$ | |
| | $d_8 = 9.89$ | $n_4 = 1.78506$ | |
| | $r_9 = -1046.936$ | $r_9' = -1046.936$ | |
| | $d_9 = 34.50$ | | |
| | $r_{10} = -746.887$ | $r_{10}' = -78.255$ | |
| | $d_{10} = 15.00$ | $n_5 = 1.78506$ | |
| | $r_{11} = -192.977$ | $r_{11}' = -36.101$ | | where $f_p$ denotes a focal length the second converging means with respect to refraction in the plane parallel to the direction of scan; $f_v$, a focal length of the second converging means with respect to refraction in the plane perpendicular to the direction of scan; L, a length of the second converging means; $r_1$ through $r_{11}$, respective radii of curvature with respect to refraction in the plane parallel to the direction of scan of the surfaces of the lenses comprising the converging means as taken in sequence in the direction extending away from the light source and then in the direction extending away from the deflecting surface; $r_1'$ through $r_{11}'$, respective radii of curvature with respect to refraction in the plane perpendicular to the direction of scan of each of the surfaces as taken in said sequence; and $d_1$ through $d_{10}$, a distance between each adjacent two of the surfaces as taken in said sequence; and $n_1$ through $n_5$, an index of refraction at a wavelength of 790 nm of each of the lenses in said sequence.

18. The system of claim 1 having an aperture ratio of 1:50 in a plane parallel to the direction of scan, an aperture ratio of 1:50 in the plane perpendicular to the direction of scan and a half deflecting angle of 30°, wherein the first converging means comprises first and second lenses which are sequentially arranged in the foregoing order in a direction extending away from the light source, and the second converging means comprises third, fourth and fifth lenses which are sequentially arranged in the foregoing order in a direction extending away from the deflecting surface, and wherein the following conditions are substantially satisfied:

| | | | |
|---|---|---|---|
| $f_p = 287.66$ | | $f_p/f_v = 4.35$ | |
| $L/f_p = 0.30$ | | $f_p/r_{10} = 0$ | |
| first converging means | $r_1 = \infty$ | $r_1' = 21.004$ | |
| | $d_1 = 4.00$ | $n_1 = 1.76530$ | |
| | $r_2 = \infty$ | $r_2' = 17.845$ | |
| | $d_2 = 5.00$ | | |
| | $r_3 = \infty$ | $r_3' = 45.422$ | |
| | $d_3 = 3.72$ | $n_2 = 1.76530$ | |
| | $r_4 = \infty$ | $r_4' = \infty$ | |
| | $d_4 = 70.73$ | | |
| deflecting surface | $r_5 = \infty$ | $r_5' = \infty$ | |
| | $d_5 = 20.48$ | | |
| second converging means | $r_6 = -68.363$ | $r_6' = -68.363$ | |
| | $d_6 = 16.61$ | $n_3 = 1.78506$ | |
| | $r_7 = -77.695$ | $r_7' = -77.695$ | |
| | $d_7 = 0.00$ | | |
| | $r_8 = 11425.394$ | $r_8' = 11425.394$ | |
| | $d_8 = 17.01$ | $n_4 = 1.78506$ | |
| | $r_9 = -8531.994$ | $r_9' = -8531.994$ | |
| | $d_9 = 35.96$ | | |
| | $r_{10} = \infty$ | $r_{10}' = -89.050$ | |
| | $d_{10} = 16.53$ | $n_5 = 1.67450$ | |
| | $r_{11} = -208.951$ | $r_{11}' = -34.131$ | | where $f_p$ denotes a focal length of the second converging means with respect to refraction in the plane parallel to the direction of scan; $f_v$, a focal length of the second converging means with respect to refraction in the plane perpendicular to the direction of scan; L, a length of the second converging means; $r_1$ through $r_{11}$, respective radii of curvature with respect to refraction in the plane parallel to the direction of scan of the surfaces of the lenses comprising the converging means as taken in sequence in the direction extending away from the light source and then in the direction extending away from the deflecting surface; $r_1'$ through $r_{11}'$, respective radii of curvature with respect to refraction in the plane perpendicular to the direction of scan of each of the surfaces as taken in said sequence; and $d_1$ through $d_{10}$, a distance between each adjacent two of the surfaces as taken in said sequence; and $n_1$ through $n_5$, an index of refraction at a wavelength of 790 nm of each of the lenses in said sequence.

* * * * *